United States Patent [19]

Adachi et al.

[11] Patent Number: 5,652,765
[45] Date of Patent: Jul. 29, 1997

[54] RECEIVER AND REPEATER FOR SPREAD SPECTRUM COMMUNICATIONS

[75] Inventors: Fumiyuki Adachi, Yokohama; Mamoru Sawahashi; Akihiro Higashi, both of Yokosuka; Koji Ohno; Tomohiro Dohi, both of Yokohama, all of Japan

[73] Assignee: NTT Mobile Communications Network Inc., Tokyo, Japan

[21] Appl. No.: 411,645

[22] PCT Filed: Aug. 4, 1994

[86] PCT No.: PCT/JP94/01283

§ 371 Date: May 22, 1995

§ 102(e) Date: May 22, 1995

[87] PCT Pub. No.: WO95/05037

PCT Pub. Date: Feb. 16, 1995

[30] Foreign Application Priority Data

Aug. 6, 1993 [JP] Japan ................................ 5-196023
Apr. 27, 1994 [JP] Japan ................................ 6-090351

[51] Int. Cl.⁶ .................... H04B 3/36; H04B 7/17; H04B 17/02; H04L 25/20
[52] U.S. Cl. ................... 375/211; 375/200; 375/208; 455/18
[58] Field of Search ....................... 375/200, 205, 375/206, 208, 209, 211, 214, 219, 222, 229, 230, 232, 233, 346, 343, 347, 348, 349, 350; 455/11.1, 12.1, 13.1, 65, 19, 132, 5, 54, 18; 380/34; 370/18

[56] References Cited

U.S. PATENT DOCUMENTS 4,761,796  8/1988  Dunn et al. ............................ 375/200
5,233,626  8/1993  Ames ................................ 375/200

FOREIGN PATENT DOCUMENTS 55-25228   2/1980   Japan.
5-268128  10/1993   Japan.
2237706    5/1991   United Kingdom.

OTHER PUBLICATIONS

Iltis et al, "A DS Spread Spectrum RAKE Receiver With Narrowband Interference Rejection Capability: Operation in Fading Channels", MILCOM'89: Bridging the Gap 1989.

Bello, "Performance of Some RAKE Modems over the Non-Distributed Wide Band HF Channel", MILCOM'88:21st Century Military Communications—What's Possible? 1988.

Simon Haykin, "Adaptive Filter Theory" (1986), Prentice Hall, pp. 381–385.

Primary Examiner—Tesfaldet Bocure
Assistant Examiner—Bryan Webster
Attorney, Agent, or Firm—Rogers & Wells

[57] ABSTRACT

A repeater improving the effect of a RAKE reception. A received signal from a base station parallelly passes a first path including a first delay circuit and a second path including no delay circuit, and is transmitted to a mobile station. A received signal from the mobile station parallelly passes a third path including a second delay circuit and a fourth path including no delay circuit, and is transmitted to the base station. The delay time of the delay circuits are set at one chip interval or more of a spreading code. This forcedly produces multipath waves which are resolvable by a RAKE receiver. The RAKE receiver estimates amplitudes of desired wave components for individual delayed waves, performs weighting of the respective delayed wave components from detectors by using the estimated amplitudes, and makes symbol decision in terms of the combined weighted signal.

22 Claims, 6 Drawing Sheets

RECEIVER AND REPEATER FOR SPREAD SPECTRUM COMMUNICATIONS

TECHNICAL FIELD

The present invention relates to a receiver and a repeater for spread-spectrum communications which improve diversity characteristics.

BACKGROUND ART

Generally, the spread-spectrum communications such as CDMA (Code Division Multiple Access) performs a plurality of modulations at a transmitting side, and corresponding demodulations at a receiving side, thereby communicating information symbols. More specifically, the transmitting side transmits information symbols after performing a primary modulation, such as PSK, of the information symbols, and then, spreading the primary modulation signal into a wideband frequency range by performing a secondary modulation using a spreading code such as a high-rate pseudo-random code. On the other hand, the receiving side performs despreading (secondary demodulation) using the same and synchronized spreading code with the transmitting side so that the wideband frequency received signal is inversely converted into the band of the information symbols, and then, carries out a primary demodulation corresponding to the primary modulation, thereby restoring the original information symbols.

When such a spread-spectrum communication method is employed in mobile communications, a signal transmitted from a base station or a mobile station will reflect from obstacles such as buildings or the like on its propagation paths. Accordingly, the signal is received as a multipath signal whose component waves (delayed waves) arrive at different times because individual delayed waves have different delay times on the propagation paths. If the variance of the delay times of the propagation paths is greater than one element length of a spreading code (one chip interval), fluctuations of the individual delayed wave components which are extracted at every chip interval can be handled as non-correlated quantity. In other words, the amplitude and phase of each delayed wave component can be considered to change independently. As a result, the average received level will be improved by combining the independent delayed wave components after making their phases coherent, or by selecting a delayed wave component whose amplitude is maximum. This idea is implemented as a well-known RAKE reception, wherein improvement in transmission characteristics can be expected owing to the path diversity receiving effect.

FIG. 1 is a block diagram showing a conventional spread-spectrum communication receiver carrying out the path diversity reception (RAKE reception). In FIG. 1, the reference numerals 1-1-1-N designate correlators. Each correlator 1-k (k=1-N) receives a spread-spectrum signal 100, into which a pilot signal is inserted, and performs despreading of one of delayed waves using the same spreading code. Here, the pilot signal is a signal (called a sounder) measuring a transfer function of a propagation path. The output of the correlator 1-k is supplied to a detector 2-k which detects one of the delayed waves. The output of the detector 2-k is supplied to a weighting circuit 3-k and a power detector 4-k. The power detector 4-k detects power of the delayed wave, and makes it a coefficient of the weighting circuit 3-k. Respective weighted signals are combined by a combining circuit 5. The combined signal is sent to a symbol decision circuit 6 which decides the symbol. When the weighting is performed using all the outputs of the power detectors 4-k, a maximal ratio combining is achieved, whereas when the detected signal of the maximum power is selected, a selection combining is achieved The conventional spread-spectrum communication system has the following drawbacks.

(1) In the above-mentioned arrangement which detects the respective delayed waves independently, the operation of the detectors will become unstable if the signal-to-noise power ratio (SNR) or the signal-to-interference power ratio (SIR) of the delayed waves is small.

(2) In the spread-spectrum communications, since the SIR changes greatly for individual information symbols, it is difficult to achieve an optimum combination even if weighting based on the received power is performed. Accordingly, only insufficient diversity effect can be obtained.

(3) A cellular mobile communication system covers a wide service area by locating a plurality radio base stations. In the service area, however, there are some areas as in tunnels where received signal strength is weak and communication quality becomes low. It is impossible to communicate in such places. Although it may possible to provide these dead zones with new base stations, this is not economical because equipment and scale of a base station are large.

(4) Although differences between delay times of propagation paths must be greater than one chip interval to divide a multipath wave into delayed waves, these differences are not always obtained in all areas. For example, assuming that the bandwidth of the primary modulation is 16 kHz, and the bandwidth of the second modulation using a spreading code is 128 times greater than that, that is 2048 kHz, the resolving power of the delay is about 0.5 micro-seconds. Accordingly, the multipath wave cannot be divided into individual delayed waves when the delay time differences of the propagation paths are less than this value. As a result, fading will occur as in TDMA, and one of the distinctive features of the CDMA are lost.

DISCLOSURE OF THE INVENTION

Therefore, an object of the present invention is to provide a repeater for a spread-spectrum mobile communication system, which can improve the communication quality in dead zones and other areas while maintaining the distinctive features of the CDMA.

Another object of the present invention is to provide a receiver for a spread-spectrum mobile communication system, which can achieve stable detecting characteristics and optimum weighting of individual delayed wave components.

In a first aspect of the present invention, there is provided a repeater for repeating transmitted and received signals between a mobile station and a base station of a mobile communication system which performs spread spectrum communications, the repeater comprising:

- a first receiving antenna for receiving an electric wave from the base station;
- a first delay circuit for providing a received signal supplied from the first receiving antenna with a predetermined amount of delay;
- a first transmitting antenna for radiating an output of the first delay circuit to the mobile station;

a second receiving antenna for receiving an electric wave from the mobile station;

a second delay circuit for providing a received signal supplied from the second receiving antenna with a predetermined amount of delay; and a second transmitting antenna for radiating an output of the second delay circuit to the base station, wherein a delay time of the first delay circuit and a delay time of the second delay circuit are set at one chip interval of a spreading code or more.

Here, the repeater may further comprise:

a first amplifier for amplifying the output of the first delay circuit, and for feeding it to the first transmitting antenna; and a second amplifier for amplifying the output of the second delay circuit, and for feeding it to the second transmitting antenna.

The first receiving antenna and the second transmitting antenna may consist of one antenna, and this antenna is connected to an input terminal of the first delay circuit and an output terminal of the second amplifier via a first circulator which separates a received signal and a transmitted signal, and the second receiving antenna and the first transmitting antenna consist of one antenna, and this antenna is connected to an input terminal of the second delay circuit and an output terminal of the first amplifier via a second circulator which separates a received signal and a transmitted signal.

The repeater may further comprise:

a third receiving antenna for receiving an electric wave from the base station;

first combining means for combining a received signal fed from the third receiving antenna with the output of the first delay circuit, and for supplying a combined signal to the first amplifier;

a fourth receiving antenna for receiving an electric wave from the mobile station; and second combining means for combining a received signal fed from the fourth receiving antenna with the output of the second delay circuit, and for supplying a combined signal to the second amplifier.

The repeater may further comprise:

a first amplifier for amplifying a received signal fed from the first receiving antenna, and for supplying an amplified signal to the first delay circuit; and a second amplifier for amplifying a received signal fed from the second receiving antenna, and for supplying an amplified signal to the second delay circuit.

The first receiving antenna and the second transmitting antenna may consist of one antenna, and this antenna may be connected to an output terminal of the second delay circuit and an input terminal of the first amplifier via a first circulator which separates a received signal and a transmitted signal, and the second receiving antenna and the first transmitting antenna may consist of one antenna, and this antenna may be connected to an output terminal of the first delay circuit and an input terminal of the second amplifier via a second circulator which separates a received signal and a transmitted signal.

The repeater may further comprise:

a third transmitting antenna for radiating an output of the first amplifier to the mobile station; and a fourth transmitting antenna for radiating an output of the second amplifier to the base station.

In a second aspect of the present invention, there is provided a spread-spectrum communication receiver comprising:

a plurality of correlators for despreading individual delayed waves contained in a received spread-spectrum signal by using an identical spreading code;

a plurality of detectors, each detects one of delayed wave components outputted from the correlators;

a plurality of weighting circuits, each multiplies an output of one of the detectors by a weighting coefficient;

a combining circuit for combining outputs of the weighting circuits;

a symbol decision circuit for making symbol decision of an output of the combining circuit;

estimation means for estimating a transfer function of a propagation path associated with each of the delayed wave components on the basis of an output of the symbol decision circuit and outputs of the correlators; and a weighting coefficient control circuit for estimating an amplitude of a desired wave component of each of the delayed wave components on the basis of each of the transfer functions estimated, and for generating the weighting coefficients based on the amplitudes.

Here, the estimation means may comprise:

a plurality of multipliers, each of which multiplies the output of the symbol decision circuit by one of the transfer functions estimated;

a plurality of subtracters for obtaining differences between the outputs of the correlators and outputs of the multipliers, respectively, and for producing the differences as estimated errors; and a calculation circuit for performing adaptive algorithm recursively estimating the transfer functions from the output of the symbol decision circuit and the estimated errors outputted from the subtracters.

The weighting coefficient control circuit may obtain a square of an absolute value of each of the transfer functions estimated, and make the square the weighting coefficient associated with each one of the delayed wave components.

The weighting coefficient control circuit may determine the weighting coefficients on the basis of a ratio between an amplitude of the desired wave component of each of the delayed wave components and corresponding one of the estimated errors.

In a third aspect of the present invention, there is provided a spread-spectrum communication system having a repeater and a spread-spectrum communication receiver, the repeater repeating transmitted and received signals between a mobile station and a base station of a mobile communication system performing spread-spectrum communications, and the spread-spectrum communication receiver being provided in the mobile station and the base station to receive transmitted signal from the repeater, the repeater comprising:

a first receiving antenna for receiving an electric wave from the base station;

a first delay circuit for providing a received signal supplied from the first receiving antenna with a predetermined amount of delay;

a first transmitting antenna for radiating an output of the first delay circuit to the mobile station;

a second receiving antenna for receiving an electric wave from the mobile station;

a second delay circuit for providing a received signal supplied from the second receiving antenna with a predetermined amount of delay; and a second transmitting antenna for radiating an output of the second delay circuit to the base station, wherein a delay time of the first delay circuit and a delay time of the second delay circuit are set at one chip interval of a spreading code or more, and the spread spectrum communication receiver comprising:

a plurality of correlators for despreading individual delayed waves contained in a received spread-spectrum signal by using an identical spreading code;

a plurality of detectors, each detects one of delayed wave components outputted from the correlators;

a plurality of weighting circuits, each multiplies an output of one of the detectors by a weighting coefficient;

a combining circuit for combining outputs of the weighting circuits;

a symbol decision circuit for making symbol decision of an output of the combining circuit;

estimation means for estimating a transfer function of a propagation path associated with each of the delayed wave components on the basis of an output of the symbol decision circuit and outputs of the correlators; and a weighting coefficient control circuit for estimating an amplitude of a desired wave component of each of the delayed wave components on the basis of each of the transfer functions estimated, and for generating the weighting coefficients based on the amplitudes.

According to the present invention, a delay difference greater than one chip interval is forcedly provided to a signal transmitted from the repeater. This makes it possible to produce good RAKE receiving effect, eliminate dead zones, and improve transmission quality in the area.

Moreover, the receiver for the spread-spectrum communication, which performs the diversity combining (RAKE reception), carries out detection and weighting using the results of symbol decision of a signal obtained by the diversity combining. That is, the detection and weighting are carried out based on desired power or SIR estimated using the results of the symbol decision. Consequently, the receiver in accordance with the present invention can obtain more stable detection results than the conventional technique which performs weighting on the basis of the received power, that is, the sum of the desired wave and interference waves.

BEST MODE FOR CARRYING OUT THE INVENTION

Embodiments of the invention will now be described with reference to the accompanying drawings.

EMBODIMENT 1

Figure 2:
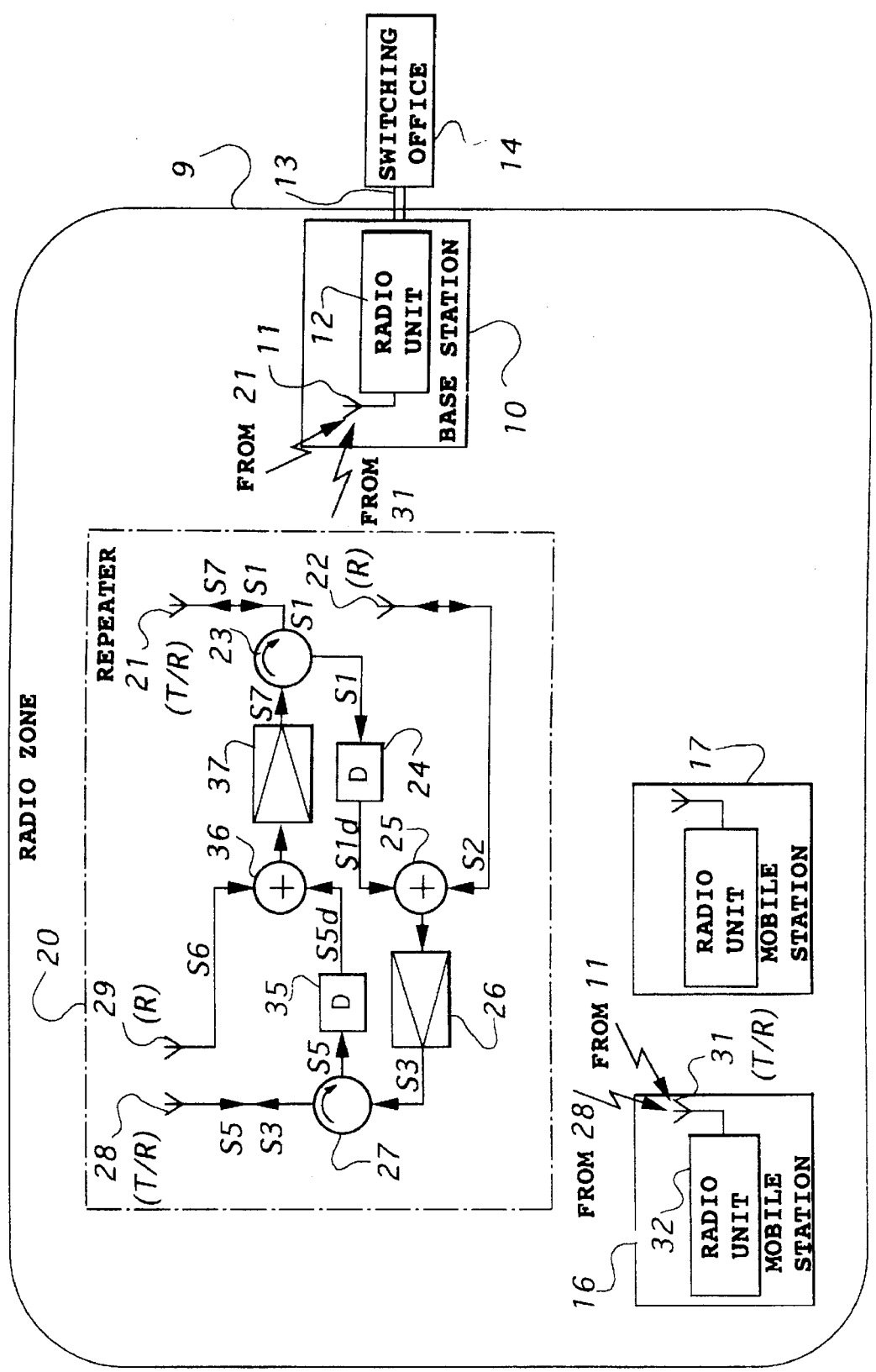
FIG. 2 is a block diagram showing an embodiment of a spread-spectrum communication repeater in accordance with the present invention.

FIG. 2 is a block diagram showing an embodiment of a mobile communication system in accordance with the present invention.

In this figure, a base station 10 covers an area (radio zone) 9, and is carrying out CDMA communications with mobile stations 16 and 17 in the area 9. The base station 10 includes a transmitting-receiving antenna 11 and a radio unit 12, and is connected to a switching office 14 via parallel lines 13. A repeater 20 in accordance with the present invention is located at a dead zone or a place where the transmission quality should be improved.

The repeater 20 has antennas 21 and 22 for the base station, and antennas 28 and 29 for mobile stations. The antennas 21 and 28 are a transmitting-receiving antenna, and the antennas 22 and 29 are a receiving antenna. The electric wave transmitted from the base station 10 at a carrier frequency f2 is received by the antennas 21 and 22. A received wave S1 by the antenna 21 is supplied to a combiner 25 through a circulator 23 for separating transmitted and received signals, and a delay circuit 24. The delay circuit 24 provides the received wave S1 with a delay of more than the element length (one chip interval) of a spreading code sequence of the spread-spectrum communications, and supplies the delayed signal $S1d$ to the combiner 25. On the other hand, the received wave S2 by the antenna 22 is directly supplied to the combiner 25, and is combined with the signal $S1d$. The combined signal is amplified by an amplifier 26, and is fed, as a signal S3, to the antenna 28 for mobile stations through a circulator 27 for separating transmitted and received signals, and is transmitted to the mobile stations. Thus, the repeater 20 transmits the signal S3 produced by combining the signal $S1d$ delayed by the delay circuit 24 with the signal S2 having no delay.

The electric wave radiated from the antenna 28 of the repeater 20 is received by a transmitting-receiving antenna 31 of a mobile station 16. The antenna 31 also receives an electric wave radiated from the transmitting-receiving antenna 11 of the base station 10. Thus, the mobile station 16 receives three signals: the delayed signal from the repeater 20; the non-delayed signal from the repeater 20; and the signal directly transmitted from the base station 10. These signals are supplied to a radio unit 32 of the mobile station 16. The radio unit 32 performs secondary demodulation (despreading) of the signals using an assigned spreading code, and RAKE reception, followed by the primary demodulation, thereby obtaining the data transmitted from the base station 10 to the mobile station 16.

On the other hand, data to be transmitted from the mobile station 16 is subject to the primary and secondary modulations in the radio unit 32, and is radiated from a transmitting-receiving antenna 31 as an electric wave whose carrier frequency is f1. The electric wave is received by antennas 28 and 29 of the repeater 20 for mobile stations. A wave S5 received by the antenna 28 is supplied to a combiner 36 through a circulator 27 for separating transmitted and received signals, and a delay circuit 35. The delay circuit 35 provides the received signal S5 with a delay time more than the length of an element (a chip interval) of the spreading code sequence of the spread-spectrum communication, and supplies a delayed signal $S5d$ to the combiner 36. On the other hand, a wave S6 received by the antenna 29 is directly supplied to the combiner 36, and is combined with the signal $S5d$. A combined signal is amplified by an amplifier 37, fed to the antenna 21 for the base station through the circulator 23 for separating transmitted and received signals, and is radiated to the base station. Thus, the repeater 20 transmits to the base station 10 a combined signal S7 of the signal S5d delayed by the delay circuit 35 and the signal S6 including no delay.

An electric wave radiated from the antenna 21 of the repeater 20 is received by the transmitting-receiving antenna 11 of the base station 10. The antenna 11 receives the electric wave radiated by the transmitting-receiving antenna 31 of the mobile station 16, as well. In other words, the base station 10 receives three signals: the signal delayed by the repeater 20, the signal not delayed by the repeater 20, and the signal directly transmitted from the mobile station 16. These signals are supplied to the radio equipment 12 of the base station. The radio equipment 12 performs the secondary demodulation (despreading) by taking correlation between the received signals and an assigned spreading code, and RAKE reception of the despread signal, followed by the primary demodulation, thereby obtaining data transmitted from the mobile station 16 to the base station 10.

Thus, setting the delay times of the delay circuits 24 and 35 at more than the chip interval of the spectrum spreading code makes it possible to produce sufficient RAKE reception effect from the signals transmitted through two or more signal paths.

Although the repeater of the first embodiment employs two receiving antennas and one transmitting antenna for each of the base station and the mobile station, it is not restricted to this arrangement. For example, a combination of three or more receiving antennas and one or more transmitting antennas can also be used. The point is to provide the same received signal with a plurality of signal paths from the received antenna to the transmitting antenna, and to provide at least one of the signal paths with a delay time of more than the chip interval of the spreading code.

Alternatively, one receiving antenna and two transmitting antennas may also be used, which is the reversal of the first embodiment. A second embodiment is a repeater having such a configuration.

EMBODIMENT 2

Figure 3A:
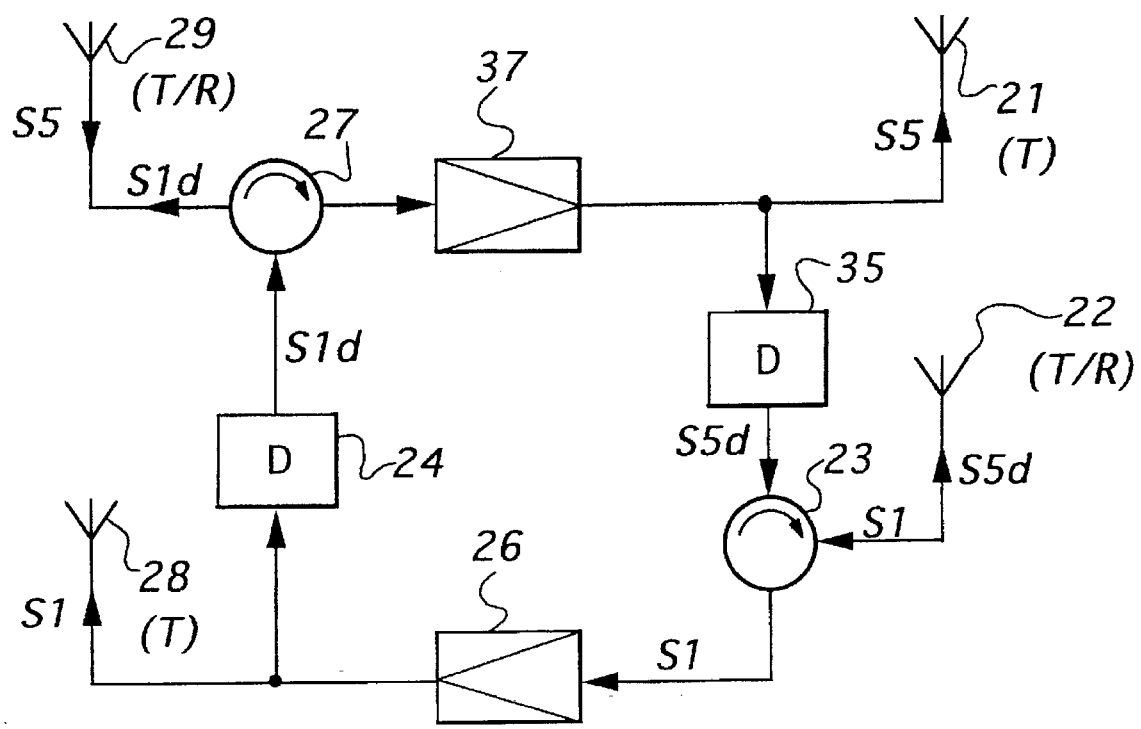
FIGS. 3A and 3B are block diagrams showing other embodiments of a spread-spectrum communication repeater in accordance with the present invention.

FIG. 3A is a block diagram showing the arrangement of a second embodiment. In FIG. 3A, antennas 21 and 22 are for a base station, and antennas 28 and 29 are for mobile stations. The antennas 21 and 28 are dedicated transmitting antennas, while the antennas 22 and 29 are transmitting-receiving antennas. A wave S1 received by the antenna 22 is supplied to the antenna 28 through a circulator 23 and an amplifier 26, and is radiated to mobile stations. The signal S1 outputted from the amplifier 26 is delayed by a delay circuit 24. A delayed signal S1d is fed to the antenna 29 through a circulator 27, and is radiated to the mobile stations. Thus, the repeater 20 transmits the delayed signal S1d and the non-delayed signal S1 to the mobile stations. The delay time of the delay circuit 24 is set at a value greater than one chip interval as in the first embodiment.

On the other hand, a received wave S5 by the antenna 29 for mobile stations is supplied to the antenna 21 through a circulator 27 and an amplifier 37, and is radiated to the base station. In addition, the received wave S5 outputted from the amplifier 37 is delayed by the delay circuit 35. The delayed signal S5d is supplied to the antenna 22 through the circulator 23, and is radiated to the base station 10. Thus, the repeater 20 transmits the delayed signal S5d and the non-delayed signal S5 to the base station 10. The delay time of the delay circuit 35 is set at a value greater than the chip interval as in the first embodiment.

When using the repeaters of the first or second embodiment for dead zones, they are placed at line-of-sight areas from which the dead zones can be unobstructedly viewed. The repeaters receive and amplify waves transmitted from the base station, and transmit them to the dead zones. The repeaters also receive and amplify waves transmitted from mobile stations in the dead zones, and transmit them to the base station. The repeaters include a plurality of signal paths between the receiving antenna and the transmitting antenna, forcedly produce multipath waves using the delay circuits, and transmit them. Accordingly, the multipath waves have time shifts by more than one chip interval and hence, they can be resolved and made phase coherent by the RAKE reception. Thus, the RAKE receiving effect in the mobile stations and the base station makes it possible to achieve high quality communications in the dead zones or in other areas.

EMBODIMENT 3

The repeater 20 generates a pair of signals in the first and second embodiments: a delayed signal and a non-delayed signal. However, considering that there are signals transmitted and received through a direct path between the base station 10 and the mobile station 16 in areas other than dead zones, a receiving side can obtain the pair of signals even if the repeater 20 transmits only a delayed signal. Consequently, such a repeater located at a place other than dead zones can considerably improve the transmission characteristic.

Figure 3B:
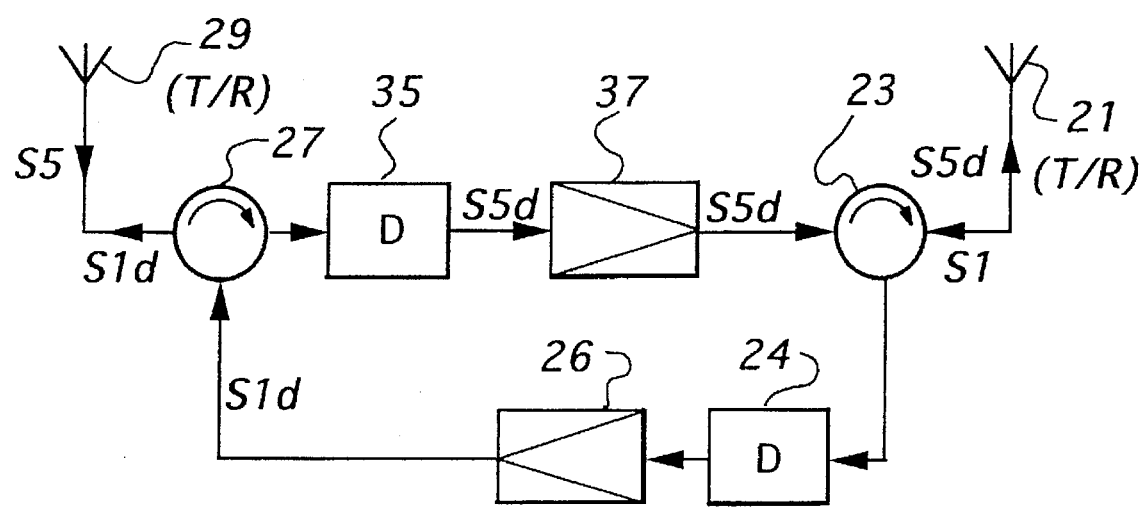

FIG. 3B is a block diagram showing such a repeater. In FIG. 3B, an antenna 21 is for the base station, and an antenna 29 is for mobile stations. Each of the antennas 21 and 29 is a transmitting-receiving antenna.

A wave S1 received by the antenna 21 for the base station is supplied to a delay circuit 24 through a circulator 23. The delay circuit 24 provides the signal S1 with a delay of one chip interval or more, and supplies the delayed signal to an amplifier 26. The amplifier 26 amplifies the delayed signal S1d, and feeds it through a circulator 27 to the antenna 29 which radiates it to mobile stations.

On the other hand, a wave S5 received by the antenna 29 for mobile stations is supplied to a delay circuit 35 through a circulator 27. The delay circuit 35 provides the signal S5 with a delay of one chip interval or more, and supplies it to an amplifier 37. The amplifier 37 amplifies the delayed signal S5d, and feeds it through the circulator 23 to the antenna 21 which radiates it to the base station.

The repeater of this embodiment is used in areas other than dead zones. For example, it is used in such areas as voice signal communications can be sufficiently achieved, but improvement in bit error rates of data signals is required.

In this case, a mobile station receives a wave directly transmitted from the base station, and the delayed wave radiated from the antenna 29 of the repeater, and carries out the secondary demodulation, the RAKE reception, and the primary demodulation, thereby obtaining the desired data from the base station. On the other hand, the base station receives a wave directly transmitted from the mobile station, and the delayed wave radiated from the antenna 21, and performs the secondary demodulation, the RAKE reception, and the primary demodulation, thereby obtaining the data from the mobile station. This makes it possible to reduce the bit error rate of the data transmission. It is obvious that the repeaters of the first and second embodiments can also be used in such places.

In mobile communications, there are substantial differences among the received levels of electric waves transmitted from individual mobile stations to the base station. This is due to large distance differences between the mobile stations and the base station, multipaths formed by reflection from buildings, or the like. Accordingly, the base station must control the transmission power level of mobile stations in such a manner that the received levels from the mobile stations meet a reference level. When the repeater in accordance with the present invention is used, the signal received via the repeater and the signal received directly are automatically combined by the RAKE reception. This has an advantage that the installation of repeaters can be achieved transparently to the base station and mobile stations.

Next, a receiver that can achieve a satisfactory RAKE reception in connection with such a repeater will be described.

EMBODIMENT 4

Figure 1:
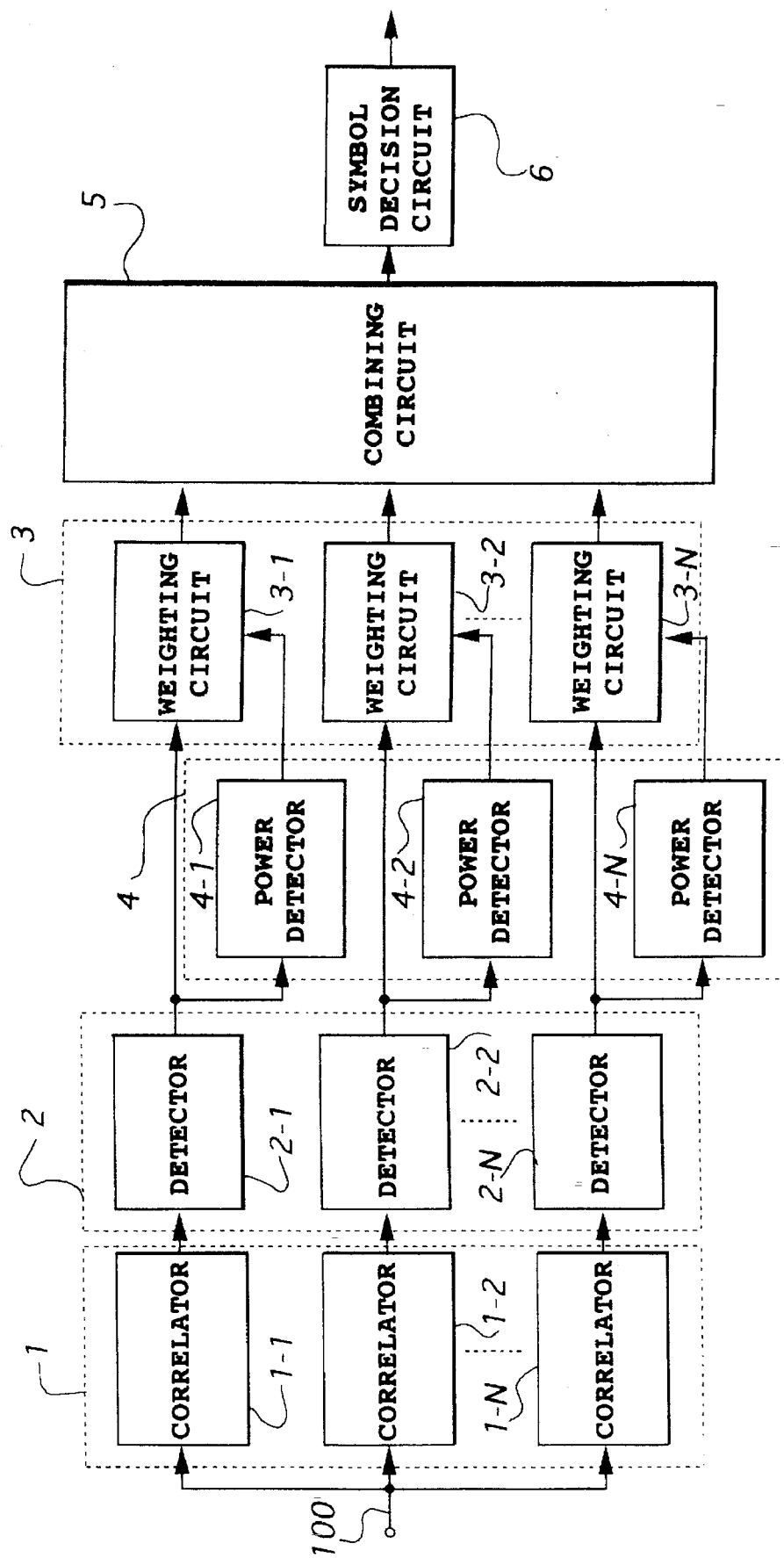
FIG. 1 is a block diagram showing an example of a conventional spread-spectrum communication receiver which performs path-diversity (RAKE) reception.
Figure 4:
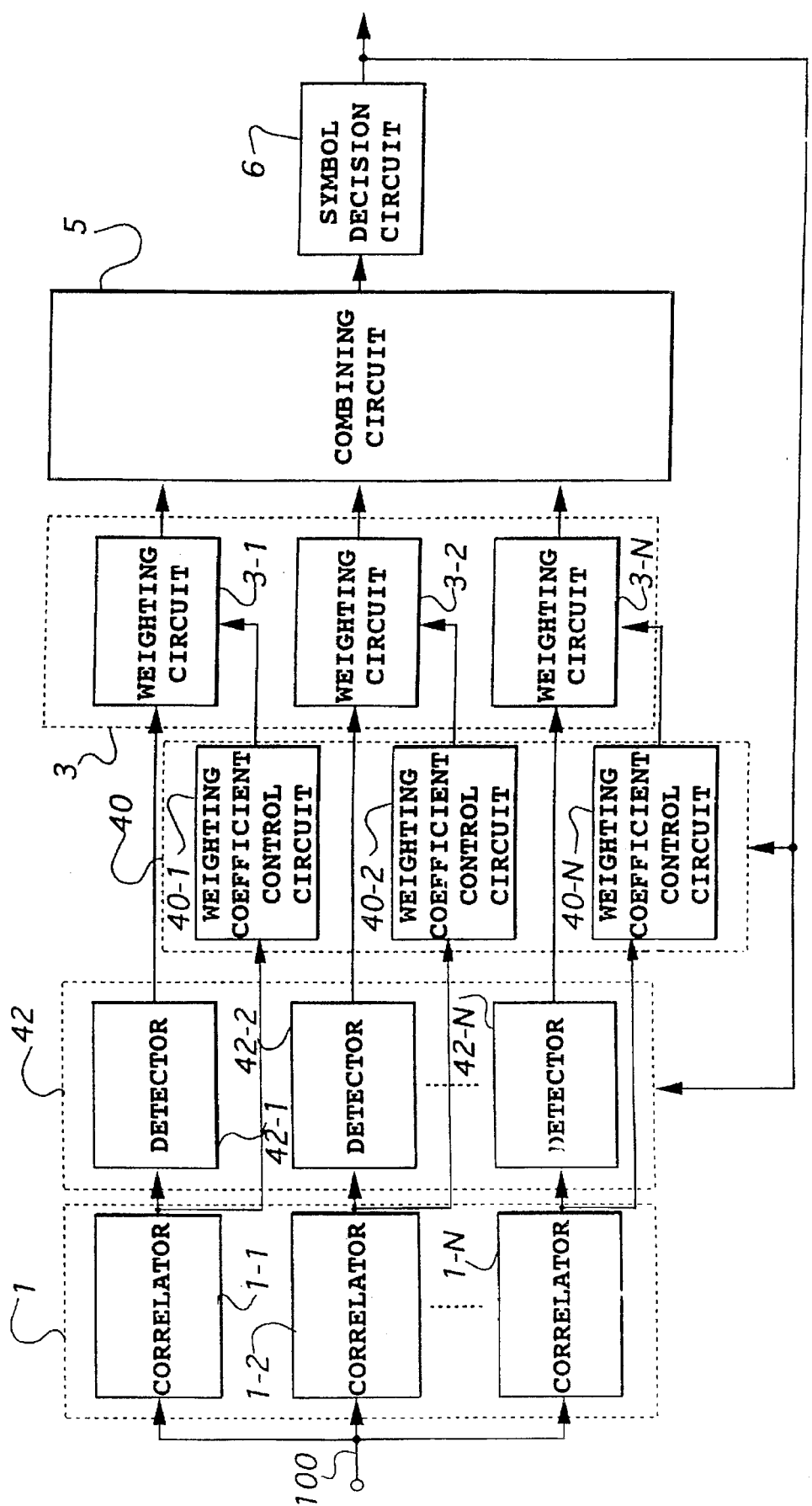
FIG. 4 is a block diagram showing an embodiment of a spread-spectrum communication receiver adopting the RAKE receiving system in accordance with the present invention.

FIG. 4 is a block diagram showing an embodiment of a spread-spectrum communication receiver in accordance with the present invention. Although the receiver adopts the RAKE receiving method as a conventional receiver as shown in FIG. 1, it differs in the following points:

(1) Instead of the detectors 2-k (k=1–N), detectors 42-k are employed.

(2) Instead of the power detectors 4-k, weighting coefficient control circuits 40-k are provided.

(3) The output of the symbol decision circuit 6 is fed back to the detectors 42-k and weighting coefficient control circuits 40-k, and is used as a reference of the detection and the weighting.

In the receiver of FIG. 4, delayed waves $i_k$ outputted from correlators 1-k are supplied to the detectors 42-k to be detected, respectively. The outputs of the detectors 42-k are supplied to the weighting coefficient control circuits 40-k, which calculate weighting coefficients of delayed wave components, respectively. Specifically, each weighting coefficient control circuit 40-k determines the weighting coefficient by comparing the symbol decision result with the output of the corresponding detector, and by detecting a desired signal component contained in the output of the detector, as will be described later. As a method for determining the weighting coefficients, weighting by the desired signal components, or weighting in accordance with SIR is used. The signals thus weighted by the weighting coefficients are combined by a combining circuit 5, and the combined signal undergoes symbol decision by the symbol decision circuit 6.

Figure 5:
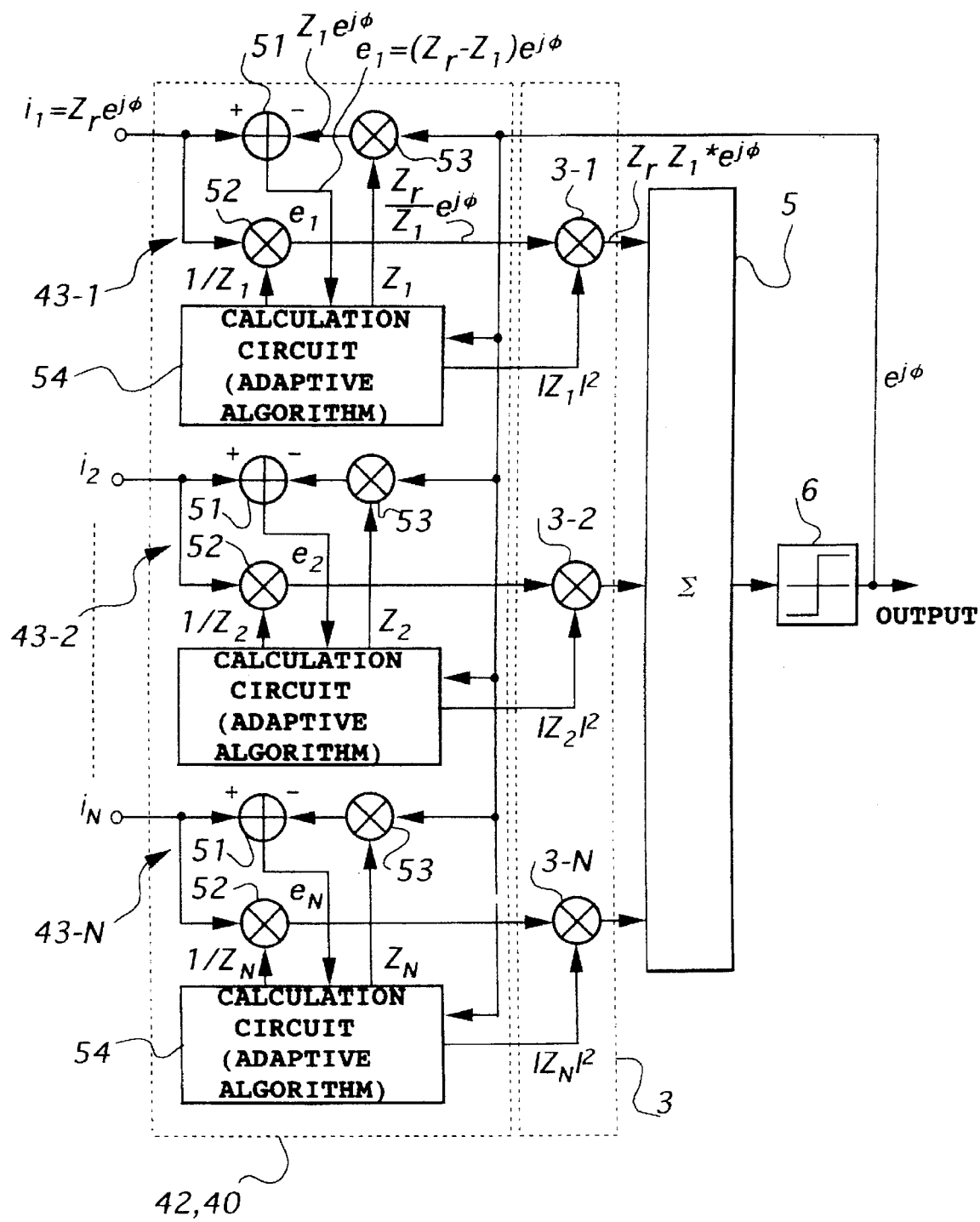
FIG. 5 is a block diagram showing a concrete arrangement from a detector to a symbol decision circuit of the embodiment of FIG. 4.

FIG. 5 is a circuit diagram showing a more specific arrangement from the detector 42 to the symbol decision circuit 6 of FIG. 4. In FIG. 5, reference numeral 43 (43-1–43-N) designates a circuit incorporating the detector 42 and the weighting coefficient control circuit 40. Each element 43-k includes a subtracter 51, multipliers 52 and 53, and a calculation circuit 54. The calculation circuit 54 includes a memory circuit storing adaptive algorithm and a calculation circuit.

Assuming that a transmitted signal whose amplitude is 1 is represented as $e^{j\phi}$, and the transfer function of the propagation path is $Z_r$, the received signal can be represented as $Z_r \times e^{j\phi}$. The transfer function $Z_r$ represents the phase shift and fluctuations of the amplitude due to fading. The purpose of the adaptive algorithm is to obtain such estimated transfer function $Z_k$ (k=1–N) that makes $Z_k=Z_r$. In other words, the purpose is to obtain $Z_k$ that will minimize the following estimated error.

$$e_k = (Z_r - Z_k) e^{j\phi}$$

The procedure for estimating the optimum $Z_k$ successively on the basis of the decided value fedback from the symbol decision circuit 6 and the estimated error $e_k$ will now be described. Details of this method is explained, for example, in Simon Haykin, "Adaptive Filter Theory", Prentice Hall, 1986 (ISBN 0-13-004052-5) pp. 381–385.

(1) The multiplier 52 multiplies the input signal $i = Z_r \times e^{j\phi}$ by $1/Z_k$. The result is $e_k = (Z_r/Z_k) e^{j\phi}$. If the estimation is correct, $Z_r = Z_k$ holds, and the transmitted signal $e^{j\phi}$ is obtained. In practice, however, the estimation includes error because of noise or the like.

(2) The weighting circuit 3-k, receiving the output of the multiplier 52, performs weighting using the square of the absolute value of the estimated transfer function $Z_k$, that is, $|Z_k|^2$, thereby carrying out the maximal ratio combining diversity.

(3) The combining circuit 5 sums up the outputs $Z_r Z_k^* e^{j\phi}$ of individual weighting circuits 3-k. Thus, the weighting combination which is a requirement of the maximal ratio combining diversity is achieved.

(4) The symbol decision circuit 6 decides the symbol produced from the combining circuit 5. The result $e_{j\phi}$ will be obtained if there is no bit error.

(5) Each multiplier 53 produces an estimated received signal. Specifically, it multiplies the output of the symbol decision circuit 6 by the estimated transfer function $Z_k$, and makes the product $Z_k \times e^{j\phi}$ the estimated received signal.

(6) Each subtracter 51 subtracts the estimated received signal $Z_k \times e^{j\phi}$ from the input signal $Z_r \times e^{j\phi}$, thereby obtaining the estimated error $e_k$.

(7) The estimated transfer function $Z_k$ is updated such that the estimated error $e_k$ is further reduced. This is performed using the adaptive algorithm in accordance with the recursive least square method (RLS), though other adaptive algorithm can be employed.

(8) The same processing is repeated after returning to (1).

Thus, the transfer function $Z_r$ of the propagation path is estimated by the adaptive algorithm, and the estimated value $Z_k$ is obtained. The ratio of the detected output of a delayed wave to the symbol decision result increases with an increase of the desired wave component in the delayed wave. The estimated value $Z_k$ represents the ratio of the detected output of each delayed wave to the symbol decision result, which indicates the magnitude of the desired wave component contained in the delayed wave. Therefore, using the estimated value $Z_k$ makes it possible to measure SNR and SIR for each delayed wave. Since the present invention performs weighting using the estimated value $Z_k$, more appropriate weighting can be achieved than the conventional weighting using the output power of the detector, thereby improving the characteristics of the RAKE reception.

The embodiment employs the delay detection or synchronous detection, and hence, the first received information symbol cannot be decoded because of phase uncertainty. However, in the delay detection, since a preamble which is a known information symbol is normally sent, the preamble symbols may be fed back to the detector 42 as the decision results. On the other hand, in the synchronous detection, a known pilot signal can be used which is inserted to obtain the absolute phase of the received signal, and whose length is one symbol interval or more. Thus, the decision results of the symbols of the pilot signal is fed back to the detector 42.

Although this embodiment carries out weighting by the power of the estimated desired wave by providing the weighting circuit 3-i with the square $|Z_k|^2$ of the absolute value of the estimated transfer function $Z_k$ from the calculation circuit 54, the weighting is not restricted to this method. For example, using the value $|Z_k|^2/|e_k|^2$ which is obtained by dividing the square $|Z_k|^2$ of the absolute value of the estimated transfer function $Z_k$ by the square $|e_k|^2$ of the absolute value of the estimated error $e_k$ enables to weight by SIR.

Furthermore, combining the receiver with the repeater in accordance with the present invention makes it possible to achieve high quality communications between a base station and a mobile station in a dead zone.

What is claimed is:

1. A repeater for repeating transmitted and received signals between a mobile station and a base station of a mobile communication system which performs spread spectrum communications, said repeater comprising:

a first receiving antenna for receiving an electric wave from said base station;

a first delay circuit for providing a received signal supplied from said first receiving antenna with a predetermined amount of delay;

a first transmitting antenna for radiating an output of said first delay circuit to said mobile station;

a second receiving antenna for receiving an electric wave from said mobile station;

a second delay circuit for providing a received signal supplied from said second receiving antenna with a predetermined amount of delay; and a second transmitting antenna for radiating an output of said second delay circuit to said base station, wherein a delay time of said first delay circuit and a delay time of said second delay circuit are set at one chip interval of a spreading code or more.

2. A repeater for repeating transmitted and received signals between a mobile station and a base station of a mobile communication system which performs spread spectrum communications, said repeater comprising:

a first receiving antenna for receiving an electric wave from said base station;

a first delay circuit for providing a received signal supplied from said first receiving antenna with a predetermined amount of delay;

a first transmitting antenna for radiating an output of said first delay circuit to said mobile station;

a first amplifier for amplifying the output of said first delay circuit, and for feeding it to said first transmitting antenna;

a second amplifier for amplifying the output of the second delay circuit, and for feeding it to the second transmitting antenna, wherein the delay amount of said first delay circuit and the delay amount of said second delay circuit are set at one chip interval of a spreading code or more.

3. The repeater as claimed in claim 2, wherein said first receiving antenna and said second transmitting antenna consist of one antenna, and this antenna is connected to an input terminal of said first delay circuit and an output terminal of said second amplifier via a first circulator which separates a received signal and a transmitted signal, and said second receiving antenna and said first transmitting antenna consist of one antenna, and this antenna is connected to an input terminal of said second delay circuit and an output terminal of said first amplifier via a second circulator which separates a received signal and a transmitted signal.

4. The repeater as claimed in claim 3, further comprising:

a third receiving antenna for receiving an electric wave from said base station;

first combining means for combining a received signal fed from said third receiving antenna with the output of said first delay circuit, and for supplying a combined signal to said first amplifier;

a fourth receiving antenna for receiving an electric wave from said mobile station; and second combining means for combining a received signal fed from said fourth receiving antenna with the output of said second delay circuit, and for supplying a combined signal to said second amplifier.

5. A repeater for repeating transmitted and received signals between a mobile station and a base station of a mobile communication system which performs spread spectrum communications, said repeater comprising:

a first receiving antenna for receiving an electric wave from said base station;

a first delay circuit for providing a received signal supplied from said first receiving antenna with a predetermined amount of delay;

a first transmitting antenna for radiating an output of said first delay circuit to said mobile station;

a first amplifier for amplifying a received signal fed from said first receiving antenna, and for supplying an amplified signal to said first delay circuit; and a second receiving antenna for receiving an electric wave from said mobile station;

a second circuit for providing a received signal supplied from said second receiving antenna with a predetermined amount of delay;

a second delay circuit for providing a received signal supplied from said second receiving antenna with a predetermined amount of delay; and a second transmitting antenna for radiating an output of said second delay circuit to the base station;

a second transmitting antenna for radiating an output of said second delay circuit to said mobile station; and a second amplifier for amplifying a received signal fed from said second receiving antenna, and for supplying an amplified signal to said second delay circuit.

6. The repeater as claimed in claim 5, wherein said first receiving antenna and said second transmitting antenna consist of one antenna, and this antenna is connected to an output terminal of said second delay circuit and an input terminal of said first amplifier via a first circulator which separates a received signal and a transmitted signal, and said second receiving antenna and said first transmitting antenna consist of one antenna, and this antenna is connected to an output terminal of said first delay circuit and an input terminal of said second amplifier via a second circulator which separates a received signal and a transmitted signal.

7. The repeater as claimed in claim 6, further comprising:

a third transmitting antenna for radiating an output of said first amplifier to said mobile station; and a fourth transmitting antenna for radiating an output of said second amplifier to said base station.

8. A spread-spectrum communication receiver comprising:

a plurality of correlators for despreading individual delayed waves contained in a received spread-spectrum signal by using an identical spreading code;

a plurality of detectors, each detects one of delayed wave components outputted from said correlators;

a plurality of weighting circuits, each multiplies an output of one of said detectors by a weighting coefficient;

a combining circuit for combining outputs of said weighting circuits;

a symbol decision circuit for making symbol decision of an output of said combining circuit;

estimation means for estimating a transfer function of a propagation path associated with each of said delayed wave components on the basis of an output of said symbol decision circuit and outputs of said correlators; and a weighting coefficient control circuit for estimating an amplitude of a desired wave component of each of said delayed wave components on the basis of each of said transfer functions estimated, and for generating said weighting coefficients based on said amplitudes.

9. The spread-spectrum communication receiver as claimed in claim 8, wherein said estimation means comprises:

a plurality of multipliers, each of which multiplies the output of said symbol decision circuit by one of said transfer functions estimated;

a plurality of subtracters for obtaining differences between the outputs of said correlators and outputs of said multipliers, respectively, and for producing said differences as estimated errors; and a calculation circuit for performing adaptive algorithm recursively estimating said transfer functions from the output of said symbol decision circuit and said estimated errors outputted from said subtracters.

10. The spread-spectrum communication receiver as claimed in claim 9, wherein said weighting coefficient control circuit obtains a square of an absolute value of each of said transfer functions estimated, and makes said square said weighting coefficient associated with each one of said delayed wave components.

11. The spread-spectrum communication receiver as claimed in claim 9, wherein said weighting coefficient control circuit determines said weighting coefficients on the basis of a ratio between an amplitude of the desired wave component of each of said delayed wave components and corresponding one of said estimated errors.

12. A spread-spectrum communication system having a repeater and a spread-spectrum communication receiver, said repeater repeating transmitted and received signals between a mobile station and a base station of a mobile communication system performing spread-spectrum communications, and said spread-spectrum communication receiver being provided in said mobile station and said base station to receive transmitted signal from said repeater, said repeater comprising:
a first receiving antenna for receiving an electric wave from said base station;
a first delay circuit for providing a received signal supplied from said first receiving antenna with a predetermined amount of delay;
a first transmitting antenna for radiating an output of said first delay circuit to said mobile station;
a second receiving antenna for receiving an electric wave from said mobile station;
a second delay circuit for providing a received signal supplied from said second receiving antenna with a predetermined amount of delay; and
a second transmitting antenna for radiating an output of said second delay circuit to said base station,
wherein a delay time of said first delay circuit and a delay time of said second delay circuit are set at one chip interval of a spreading code or more, and said spread spectrum communication receiver comprising:
a plurality of correlators for despreading individual delayed waves contained in a received spread-spectrum signal by using an identical spreading code;

a plurality of detectors, each detects one of delayed wave components outputted from said correlators;

a plurality of weighting circuits, each multiplies an output of one of said detectors by a weighting coefficient;

a combining circuit for combining outputs of said weighting circuits;

a symbol decision circuit for making symbol decision of an output of said combining circuit;

estimation means for estimating a transfer function of a propagation path associated with each of said delayed wave components on the basis of an output of said symbol decision circuit and outputs of said correlators; and a weighting coefficient control circuit for estimating an amplitude of a desired wave component of each of said delayed wave components on the basis of each of said transfer functions estimated, and for generating said weighting coefficients based on said amplitudes.

13. The spread-spectrum communication system as claimed in claim 12, further comprising:

a first amplifier for amplifying the output of said first delay circuit, and for feeding it to said first transmitting antenna; and a second amplifier for amplifying the output of said second delay circuit, and for feeding it to said second transmitting antenna.

14. The spread-spectrum communication system as claimed in claim 13, wherein said first receiving antenna and said second transmitting antenna consist of one antenna, and this antenna is connected to an input terminal of said first delay circuit and an output terminal of said second amplifier via a first circulator which separates a received signal and a transmitted signal, and said second receiving antenna and said first transmitting antenna consist of one antenna, and this antenna is connected to an input terminal of said second delay circuit and an output terminal of said first amplifier via a second circulator which separates a received signal and a transmitted signal.

15. The spread-spectrum communication system as claimed in claim 14, further comprising:

a third receiving antenna for receiving an electric wave from said base station;

first combining means for combining a received signal fed from said third receiving antenna with the output of said first delay circuit, and for supplying a combined signal to said first amplifier;

a fourth receiving antenna for receiving an electric wave from said mobile station; and second combining means for combining a received signal fed from said fourth receiving antenna with the output of said second delay circuit, and for supplying a combined signal to said second amplifier.

16. The spread-spectrum communication system as claimed in claim 12, further comprising:

a first amplifier for amplifying a received signal fed from said first receiving antenna, and for supplying an amplified signal to said first delay circuit; and a second amplifier for amplifying a received signal fed from said second receiving antenna, and for supplying an amplified signal to said second delay circuit.

17. The spread-spectrum communication system as claimed in claim 16, wherein said first receiving antenna and said second transmitting antenna consist of one antenna, and this antenna is connected to an output terminal of said second delay circuit and an input terminal of said first amplifier via a first circulator which separates a received signal and a transmitted signal, and said second receiving antenna and said first transmitting antenna consist of one antenna, and this antenna is connected to an output terminal of said first delay circuit and an input terminal of said second amplifier via a second circulator which separates a received signal and a transmitted signal.

18. The spread-spectrum communication system as claimed in claim 17, further comprising:

a third transmitting antenna for radiating an output of said first amplifier to said mobile station; and a fourth transmitting antenna for radiating an output of said second amplifier to said base station.

19. The spread-spectrum communication system as claimed in claim 12, wherein said estimation means comprises:

a plurality of multipliers, each of which multiplies the output of said symbol decision circuit by one of said transfer functions estimated;

a plurality of subtracters for obtaining differences between the outputs of said correlators and outputs of said multipliers, respectively, and for producing said differences as estimated errors; and a calculation circuit for performing adaptive algorithm recursively estimating said transfer functions from the output of said symbol decision circuit and said estimated errors outputted from said subtracters.

20. The spread-spectrum communication system as claimed in claim 19, wherein said weighting coefficient control circuit obtains a square of an absolute value of each of said transfer functions estimated, and makes said square said weighting coefficient associated with each one of said delayed wave components.

21. The spread-spectrum communication system as claimed in claim 19, wherein said weighting coefficient control circuit determines said weighting coefficients on the basis of a ratio between an amplitude of the desired wave component of each of said delayed wave components and corresponding one of said estimated errors.

22. A repeater for repeating transmitted and received signals between a mobile station and a base station of a mobile communication system which performs spread communication, said repeater comprising:

receiving antenna means for receiving an electric signal wave from said base station;

transmitting antenna means for radiating the received electric signal wave to said mobile station;

amplifier means disposed between the receiving antenna means and the transmitting antenna means for amplifying the electric signal wave;

delay means disposed between the receiving antenna means and the transmitting antenna means for providing the same electric signal wave with a plurality of signal paths from the receiving antenna means to the transmitting antenna means and providing at least one of the signal paths with a delay time of one chip interval of a spreading code or longer.

\* \* \* \* \*